United States Patent
Bao et al.

(10) Patent No.: US 10,545,867 B2
(45) Date of Patent: Jan. 28, 2020

(54) DEVICE AND METHOD FOR ENHANCING ITEM ACCESS BANDWIDTH AND ATOMIC OPERATION

(71) Applicant: Sanechips Technology Co., Ltd., Shenzhen, Guangdong (CN)

(72) Inventors: Chuang Bao, Shenzhen (CN); Zhenlin Yan, Shenzhen (CN); Chunhui Zhang, Shenzhen (CN); Kang An, Shenzhen (CN)

(73) Assignee: SANECHIPS TECHNOLOGY CO., LTD. (CN)

( * ) Notice: Subject to any disclaimer, the term of this patent is extended or adjusted under 35 U.S.C. 154(b) by 50 days.

(21) Appl. No.: 15/739,243

(22) PCT Filed: May 10, 2016

(86) PCT No.: PCT/CN2016/081618
§ 371 (c)(1),
(2) Date: Dec. 22, 2017

(87) PCT Pub. No.: WO2016/206490
PCT Pub. Date: Dec. 29, 2016

(65) Prior Publication Data
US 2018/0314634 A1    Nov. 1, 2018

(30) Foreign Application Priority Data
Jun. 26, 2015    (CN) .......................... 2015 1 0364814

(51) Int. Cl.
*G06F 12/00* (2006.01)
*G06F 12/0802* (2016.01)
(Continued)

(52) U.S. Cl.
CPC ...... *G06F 12/0802* (2013.01); *G06F 12/0879* (2013.01); *H04L 29/06* (2013.01); *H04L 67/2842* (2013.01); *G06F 2212/1024* (2013.01)

(58) Field of Classification Search
CPC ............. G06F 12/0802; G06F 12/0879; G06F 2212/1024; H04L 29/06; H04L 67/2842
See application file for complete search history.

(56) References Cited

U.S. PATENT DOCUMENTS 7,200,713 B2    4/2007    Cabot
7,921,243 B1    4/2011    White
(Continued)

FOREIGN PATENT DOCUMENTS

CN    1470996 A    1/2004
CN    1863169 A    11/2006
(Continued)

OTHER PUBLICATIONS

International Search Report in international application No. PCT/CN2016/081618, dated Jul. 28, 2016, 2 pgs.
(Continued)

*Primary Examiner* — Shawn X Gu
(74) *Attorney, Agent, or Firm* — McDonald Hopkins LLC

(57) ABSTRACT

A device, method, and a data storage medium, configured to enhance an item access bandwidth and atomic operation are provided. The device comprises: a comparison module, a cache, and a distribution module; wherein the comparison module is configured to receive a query request from a service side, determine whether an address pointed to by the query request and an item address stored in the cache are identical. If so, and a valid identifier vld is valid, the comparison module is configured to directly return the item data stored in the cache to the service side without initiating a request for looking up an off-chip memory, so as to reduce (Continued)

a frequency of accessing the off-chip memory. If not, the comparison module is configured to initiate a request for looking up the off-chip memory, so as to process, according to a first preconfigured rule, item data returned by the off-chip memory.

19 Claims, 6 Drawing Sheets

(51) Int. Cl.
*G06F 12/0879* (2016.01)
*H04L 29/06* (2006.01)
*H04L 29/08* (2006.01)

(56) References Cited

U.S. PATENT DOCUMENTS

| | | | |
|---|---|---|---|
| 8,335,122 | B2 | 12/2012 | Dreslinski, Jr. |
| 2005/0055349 | A1 | 3/2005 | Frazer |
| 2008/0301371 | A1* | 12/2008 | Peled ................ G06F 12/0804 711/128 |
| 2009/0138680 | A1* | 5/2009 | Johnson ............... G06F 9/3001 712/208 |
| 2010/0146415 | A1 | 6/2010 | Lepeska |
| 2014/0317694 | A1 | 10/2014 | Grube et al. |

FOREIGN PATENT DOCUMENTS

| | | |
|---|---|---|
| CN | 101340365 A | 1/2009 |
| CN | 101526896 A | 9/2009 |
| CN | 101534477 A | 9/2009 |
| CN | 101620623 A | 1/2010 |
| CN | 101651628 A | 2/2010 |
| CN | 101719055 A | 6/2010 |
| CN | 102073539 A | 5/2011 |
| CN | 102831078 A | 12/2012 |
| CN | 104378295 A | 2/2015 |
| CN | 104601471 A | 5/2015 |
| WO | 2011067932 A1 | 6/2011 |
| WO | 2011119606 A3 | 9/2011 |

OTHER PUBLICATIONS

English Translation of the Written Opinion of the International Search Authority in international application No. PCT/CN2016/081618, dated Jul. 28, 2016, 6 pgs.
Supplementary European Search Report in European application No. 16813606.7, dated Jun. 28, 2018, 4 pgs.

* cited by examiner

DEVICE AND METHOD FOR ENHANCING ITEM ACCESS BANDWIDTH AND ATOMIC OPERATION

TECHNICAL FIELD

The disclosure relates to an item management technology, and in particular to a device and method for improving an item access bandwidth and atomic operation, and a computer storage medium.

BACKGROUND

A Network Processor (NP) is an Application Specific Instruction Processor (ASIP) designed for network applications; the ASIP has its own structure characteristics and specialized circuit designs to apply to network packet processing; besides, it is a software programmable chip. The NP enables a network system to have high performance and flexibility.

The NP is applied to different situations. Types of table lookup, item capacities, sizes of item entry and requirements on table lookup performance have great difference, so the technical problems to be solved include the following two aspects:

1. the NP manages items, requiring seamless and faultless lookup under the condition of realizing a certain update performance. For the storage of an item with big single entry width, multiple memory addresses may be needed to store a single entry; so, in an item update process, it is especially important to ensure an atomic operation of the item; and 2. when the item is stored in an off-chip memory, due to the influence of its own structure, an access bandwidth in an item lookup process is also the problem to be solved.

SUMMARY

In view of this, the disclosure is intended to provide a device and method for improving an item access bandwidth and atomic operation, and a computer storage medium, which at least improves an access bandwidth during item lookup and ensures that the atomic operation can realize a seamless and faultless lookup.

The technical solutions of the disclosure are implemented as follows.

The disclosure provides a device for improving an item access bandwidth and atomic operation, which includes: a comparison module, a cache, and a distribution module;

the comparison module is arranged to: after a lookup request is received from a service side, determine whether an address pointed to by the lookup request is identical to an item address stored in the cache; if they are identical, and a valid identifier vld is currently valid, directly return item data stored in the cache to the service side without initiating a request for looking up an off-chip memory, so as to reduce accessing the off-chip memory; and if they are not identical, initiate a request for looking up the off-chip memory, so as to process, according to a preset rule, item data returned by the off-chip memory in such a way that an atomic operation existed in item updating can realize a seamless and faultless lookup in an item lookup process;

the cache is arranged to store the item data and the item address; and the distribution module is arranged to identify whether the data to be returned to the service side is the item data in the cache or the item data in the off-chip memory, and then return the data to the service side.

In the above solution, the comparison module is further arranged to determine, according to the first preset rule, whether the address pointed to by the lookup request is identical to the address stored in the cache, including any one of the following ways:

way 1: if a vld corresponding to a low first-threshold-M bit address is completely valid, and the high second-threshold-N bit address is identical to the address stored in the cache, returning data in the cache to the service side, and not updating the data in the cache; if the addresses are not identical, not updating the data in the cache, and sending the data returned by the off-chip memory to the service side;

way 2: if the vld corresponding to the low first-threshold-M bit address is partially valid, not updating the data in the cache, and sending the data returned by the off-chip memory to the service side; and way 3: if the vld corresponding to the low first-threshold-M bit address is invalid, updating the data in the cache, and sending the data returned by the off-chip memory to the service side;

herein both M and N are natural numbers, and the sum of M and N is a bit width requested by the service side.

In the above solution, the device further includes:

a first mediation module arranged to perform mediation between writing data into the cache by a central processing unit and writing the item data returned by the off-chip memory into the cache;

a control module arranged to manage vld bits and determine when to initiate an update operation on the off-chip memory; and a central processing unit arranged to configure a service item, and for the case of single-burst item update, give an instruction of writing a single-burst item; the central processing unit is arranged to, after the mediation by the first mediation module, write the high second-threshold-N bit address of the item or the item data into the cache by taking the low first-threshold-M bit address as an address, set a vld register corresponding to the address through the control module, and give an instruction of updating the off-chip memory to complete the item update; herein both M and N are natural numbers, and the sum of M and N is the bit width requested by the service side.

In the above solution, the device further includes:

the first mediation module arranged to perform mediation between writing, by the central processing unit, data into the cache and writing the item data returned by the off-chip memory into the cache;

the control module arranged to manage the vld bits and determine when to initiate the update operation on the off-chip memory;

the central processing unit arranged to configure the service item, and for the case of multiple-burst item update, give an instruction of writing a multiple-burst item; after the mediation by the first mediation module, the first burst writes the high second-threshold-N bit address of the item or the item data into the cache by taking a value obtained by left shifting the low first-threshold-M bit address for 2^S bits as an address, the vld corresponding to the address is set to 0 through the control module, and the instruction of updating the off-chip memory is not given; the second burst writes the high second-threshold-N bit address of the item or the item data into the cache by taking the value obtained by left shifting the low first-threshold-M bit address for 2^S bits plus 1 as an address; the vld corresponding to the address is set to 0 through the control module, and the instruction of updating the off-chip memory is not given; at the same time, the vld of the first burst is set to 1, and an instruction of updating a vld item is given; by analogy, when the address of the penultimate burst returned by the off-chip memory matches the address, obtained by left shifting the low first-threshold-M bit address for 2^S bit, +S−2, the vld corresponding to the last burst is set to 1, and the instruction of updating the off-chip memory is given to complete the item update; herein both M and N are natural numbers, and the sum of M and N is the bit width requested by the service side.

In the above solution, the device further includes:

a lookup information storage module arranged to store a table lookup request and multiple-burst flag information;

the comparison module is further arranged to, for the case of single-burst item, determine whether the vld corresponding to the low first-threshold-M bit address of the lookup request is valid, and if it is valid, initiate a lookup of the cache by using the low first-threshold-M bit address of the lookup request, and obtain a lookup result; the comparison module is further arranged to parse the lookup result, compare the found address with the high second-threshold-N bit address of the lookup request, and if they are identical, directly return the result from cache lookup to the service side through the distribution module, not initiate the request for looking up the off-chip memory, and read and discard data in the lookup information storage module; herein both M and N are natural numbers, and the sum of M and N is the bit width requested by the service side; and a second mediation module arranged to perform mediation between reading the cache by the service side and returning reading of the cache by the off-chip memory;

the off-chip memory is arranged to store a lookup item.

In the above solution, the device further includes:

the lookup information storage module arranged to store a table lookup request and multiple-burst flag information;

the comparison module is further arranged to, for the case of multiple-burst item, and when there are 2^S multiple-burst items, determine through the control module whether the vlds corresponding to 2^S contiguous addresses after the low first-threshold-M bit address of the lookup request is left shifted for S bits are valid, and if all of them are valid, continuously initiate 2^S requests for looking up the cache after the low first-threshold-M bit address of the lookup quest is left shifted for S bits, and obtain a lookup result; the comparison module is further arranged to parse the lookup result, compare the found address with the high second-threshold-N bit address of the lookup request, and if they are identical, directly return the spliced results from cache lookup to the service side, not initiate the request for looking up the off-chip memory, and read and discard the data in the lookup information storage module; herein both M and N are natural numbers, and the sum of M and N is the bit width requested by the service side; S is a natural number;

the second mediation module is arranged to perform mediation between reading the cache by the service side and returning reading of the cache by the off-chip memory;

the off-chip memory is arranged to store the lookup item.

In the above solution, the comparison module is further arranged to, when the lookup request matches none of the addresses in the cache, initiate the request for looking up the off-chip memory, and after the item data is returned, take the item address and multiple-burst information out from the lookup information storage module; for the case of single-burst item, the comparison module is further arranged to determine through the control module whether the vld corresponding to the low first-threshold-M bit address of the address is valid, and if it is valid, read the cache after the mediation of the second mediation module, compare the high second-threshold-N bits of the acquired address with the high second-threshold-N bits of the taken-out address; if they match, the comparison module is further arranged to replace the data of the corresponding address with the item data returned from the off-chip memory and write the data back into the cache, and return the data to the service side through the distribution module.

In the above solution, the comparison module is further arranged to, when the lookup request matches none of the addresses in the cache, initiate the request for looking up the off-chip memory, and after the item data is returned, take the item address and multiple-burst information out from the lookup information storage module; for the case of multiple-burst item, the comparison module is further arranged to first determine through the control module whether the vlds corresponding to 2^S contiguous addresses after the low first-threshold-M bit address of the address is left shifted for S bits are valid, and all of them are valid, read the cache after the mediation of the second mediation module, and compare the high second-threshold-N bits of the acquired address with the high second-threshold-N bits of the taken-out address; if they match, the comparison module is further arranged to replace the data of the corresponding address with the item data returned from the off-chip memory and write the data back into the cache, and return the data to the service side through the distribution module.

In the above solution, the comparison module is further arranged to, when the lookup request is received, according to a multiple-burst identifier carried in the lookup request, determine through the control module whether the vld corresponding to 2^S contiguous requests after the low first-threshold-M bit address of a service request is left shifted for S bits is valid, and if it is valid, read the data of the corresponding cache, and determine whether the high second-threshold-N bit address of the service request matches the address in the cache; the comparison module is further arranged to, if they match, directly return the data to the service side, and if they do not match, initiate the request for looking up the off-chip memory.

In the above solution, the comparison module is further arranged to, after the item data is returned, read the lookup information storage module to acquire a lookup request address and a multiple-burst identifier, determine through the control module whether the vld corresponding to 2^S contiguous requests after the low first-threshold-M bit address of the service request is left shifted for S bits is valid, and if it is valid, read the data of the corresponding cache, and determine whether the high second-threshold-N bit address of the service request matches a service address returned to the cache; the comparison module is further arranged to, if they match, return the item data in the cache to the service side through the distribution module, not update the item data in the cache, and if they do not match, directly return the item data in the off-chip memory to the service side through the distribution module, and update the item data in the cache; if the vld corresponding to the multiple bursts is partially valid, it is indicated that the item update is not completed, the comparison module is further arranged to return the item data in the off-chip memory to the service side through the distribution module, and not update the item data in the cache.

The comparison module, the cache, the distribution module, the first mediation module, the control module, and the central processing unit, the lookup information storage module, the second mediation module and the off-chip memory can be realized by a Central Processing Unit (CPU), a Digital Signal Processor (DSP) or a Field-Programmable Gate Array (FPGA).

The disclosure provides a method for improving an item access bandwidth and atomic operation, which is applied to any device in the above solutions; the method includes that:

after a lookup request is received from a service side, it is determined whether the address pointed to by the lookup request is identical to the item address stored in the cache;

if they are identical, and the valid identifier vld is currently valid, the item data stored in the cache is directly returned to the service side without initiating the request for looking up the off-chip memory, so as to reduce accessing the off-chip memory;

if they are not identical, the request for looking up the off-chip memory is initiated, so as to process, according to the preset rule, the item data returned by the off-chip memory in such a way that the atomic operation existed in item updating can realize the seamless and faultless lookup in the item lookup process.

In the above solution, the first preset rule is used for determining whether the address pointed to by the lookup request is identical to the address stored in the cache, including any one of the following ways:

way 1: if a vld corresponding to a low first-threshold-M bit address is completely valid, and the high second-threshold-N bit address is identical to the address stored in the cache, returning data in the cache to the service side, and not updating the data in the cache; if the addresses are not identical, not updating the data in the cache, and sending the data returned by the off-chip memory to the service side;

way 2: if the vld corresponding to the low first-threshold-M bit address is partially valid, not updating the data in the cache, and sending the data returned by the off-chip memory to the service side; and way 3: if the vld corresponding to the low first-threshold-M bit address is invalid, updating the data in the cache, and sending the data returned by the off-chip memory to the service side;

herein both M and N are natural numbers, and the sum of M and N is the bit width requested by the service side.

In the above solution, the method further includes that:

the central processing unit configures the service item, and for the case of single-burst item update, gives an instruction of writing the single-burst item;

after the mediation by the first mediation module, the high second-threshold-N bit address of the item or the item data is written into the cache by taking the low first-threshold-M bit address as an address, the vld register corresponding to the address is set through the control module, and an instruction of updating the off-chip memory is given to complete the item update; herein both M and N are natural numbers, and the sum of M and N is the bit width requested by the service side.

In the above solution, the method further includes that:

the central processing unit configures the service item, and for the case of multiple-burst item update, gives an instruction of writing the multiple-burst item;

after the mediation by the first mediation module, the first burst writes the high second-threshold-N bit address of the item or the item data into the cache by taking the value obtained by left shifting the low first-threshold-M bit address for $2^S$ bits as an address, sets the vld corresponding to the address to 0 through the control module, and does not give the instruction of updating the off-chip memory;

the second burst writes the high second-threshold-N bit address of the item or the item data into the cache by taking the value obtained by left shifting the low first-threshold-M bit address for $2^S$ bits plus 1 as an address, sets the vld corresponding to the address to 0 through the control module, and does not give the instruction of updating the off-chip memory; at the same time, the second burst sets the vld of the first burst to 1, and gives an instruction of updating the vld item;

by analogy, when the address of the penultimate burst returned by the off-chip memory matches the address, obtained by left shifting the low first-threshold-M bit address for $2^S$ bit, +S−2, the vld corresponding to the last burst is set to 1, and the instruction of updating the off-chip memory is given to complete the item update; herein both M and N are natural numbers, and the sum of M and N is the bit width requested by the service side.

In the above solution, the method further includes that:

for the case of single-burst item, the comparison module determines whether the vld corresponding to the low first-threshold-M bit address of the lookup request is valid, if it is valid, initiates a lookup of the cache by using the low first-threshold-M bit address of the lookup request, and obtains a lookup result;

the lookup result is parsed, and the found address is compared with the high second-threshold-N bit address of the lookup request; if they are identical, the result from cache lookup is directly returned to the service side through the distribution module, the request for looking up the off-chip memory is not initiated, and data in the lookup information storage module is read and discarded; herein both M and N are natural numbers, and the sum of M and N is the bit width requested by the service side.

In the above solution, the method further includes that:

for the case of multiple-burst item, and when there are $2^S$ multiple-burst items, the comparison module determines through the control module whether the vlds corresponding to $2^S$ contiguous addresses after the low first-threshold-M bit address of the lookup request is left shifted for S bits are valid; if all of them are valid, the comparison module continuously initiates $2^S$ requests for looking up the cache after left shifting the low first-threshold-M bit address of the lookup quest for S bits, and obtains a lookup result;

the lookup result is parsed, and the found address is compared with the high second-threshold-N bit address of the lookup request; if they are identical, the spliced results from cache lookup are directly returned to the service side, the request for looking up the off-chip memory is not initiated, and the data in the lookup information storage module is read and discarded; herein both M and N are natural numbers, and the sum of M and N is the bit width requested by the service side; S is a natural number.

In the above solution, the method further includes that:

when the lookup request matches none of the addresses in the cache, the comparison module initiates the request for looking up the off-chip memory, and after the item data is returned, takes the item address and multiple-burst information out from the lookup information storage module;

for the case of single-burst item, it is determined through the control module whether the vld corresponding to the low first-threshold-M bit address of the address is valid; if it is valid, the cache is read after the mediation of the second mediation module, and the high second-threshold-N bits of the acquired address is compared with the high second-threshold-N bits of the taken-out address; if they match, the data of the corresponding address is replaced with the item data returned from the off-chip memory and the data is written back into the cache, and the data is returned to the service side through the distribution module.

In the above solution, the method further includes that:

when the lookup request matches none of the addresses in the cache, the comparison module initiates the request for looking up the off-chip memory, and after the item data is returned, takes the item address and multiple-burst information out from the lookup information storage module;

for the case of multiple-burst item, first it is determined through the control module whether the vlds corresponding to 2^S contiguous addresses after the low first-threshold-M bit address of the address is left shifted for S bits are valid; if all of them are valid, the cache is read after the mediation of the second mediation module, and the high second-threshold-N bits of the acquired address is compared with the high second-threshold-N bits of the taken-out address; if they match, the data of the corresponding address is replaced with the item data returned from the off-chip memory and the data is written back into the cache, and the data is returned to the service side through the distribution module.

In the above solution, the method further includes that:

when the lookup request is received, the comparison module determines through the control module whether the vld corresponding to 2^S contiguous requests after the low first-threshold-M bit address of the service request is left shifted for S bits is valid according to the multiple-burst identifier carried in the lookup request; if it is valid, the data of the corresponding cache is read, and it is determined whether the high second-threshold-N bit address of the service request matches the address in the cache; if they match, the data is directly returned to the service side; if they do not match, the request for looking up the off-chip memory is initiated.

In the above solution, the method further includes that:

after the item data is returned, the comparison module reads the lookup information storage module to acquire the lookup request address and the multiple-burst identifier;

it is determined through the control module whether vld corresponding to 2^S contiguous requests after the low first-threshold-M bit address of the service request is left shifted for S bits is valid; if all of them are valid, the data of the corresponding cache is read; it is determined whether the high second-threshold-N bit address of the service request matches a service address returned to the cache; if they match, the item data in the cache is returned to the service side through the distribution module, and the item data in the cache is not updated; if they do not match, the item data in the off-chip memory is directly returned to the service side through the distribution module, at the same time, the item data in the cache is updated; if the vld corresponding to the multiple-burst is partially valid, which indicates that the item update is not completed, the item data in the off-chip memory is returned to the service side through the distribution module, and the item data in the cache is not updated.

The disclosure also provides a computer storage medium, in which a computer executable instruction is stored; the computer executable instruction is arranged to perform the method for improving an item access bandwidth and atomic operation.

The device for improving an item access bandwidth and atomic operation of the disclosure includes the comparison module, the cache, and the distribution module, herein the comparison module is arranged to: after a lookup request is received from the service side, determine whether the address pointed to by the lookup request is identical to the item address stored in the cache; if they are identical, and the valid identifier vld is currently valid, directly return the item data stored in the cache to the service side without initiating the request for looking up the off-chip memory, so as to reduce accessing the off-chip memory; and if they are not identical, initiate the request for looking up the off-chip memory, so as to process, according to the preset rule, the item data returned by the off-chip memory in such a way that the atomic operation existed in item updating can realize a seamless and faultless lookup in an item lookup process; the cache is arranged to store the item data and the item address; and the distribution module is arranged to identify whether the data to be returned to the service side is the item data in the cache or the item data in the off-chip memory, and then return the data to the service side.

By applying the disclosure, because it is not always needed to initiate the request for looking up the off-chip memory, the number of accesses to the off-chip memory is reduced, and a looking up bandwidth is reduced; moreover, the item data returned by the off-chip memory is processed according to the preset rule, as such, the atomic operation existed in item updating can realize a seamless and faultless lookup in an item lookup process.

DETAILED DESCRIPTION

Figure 1:
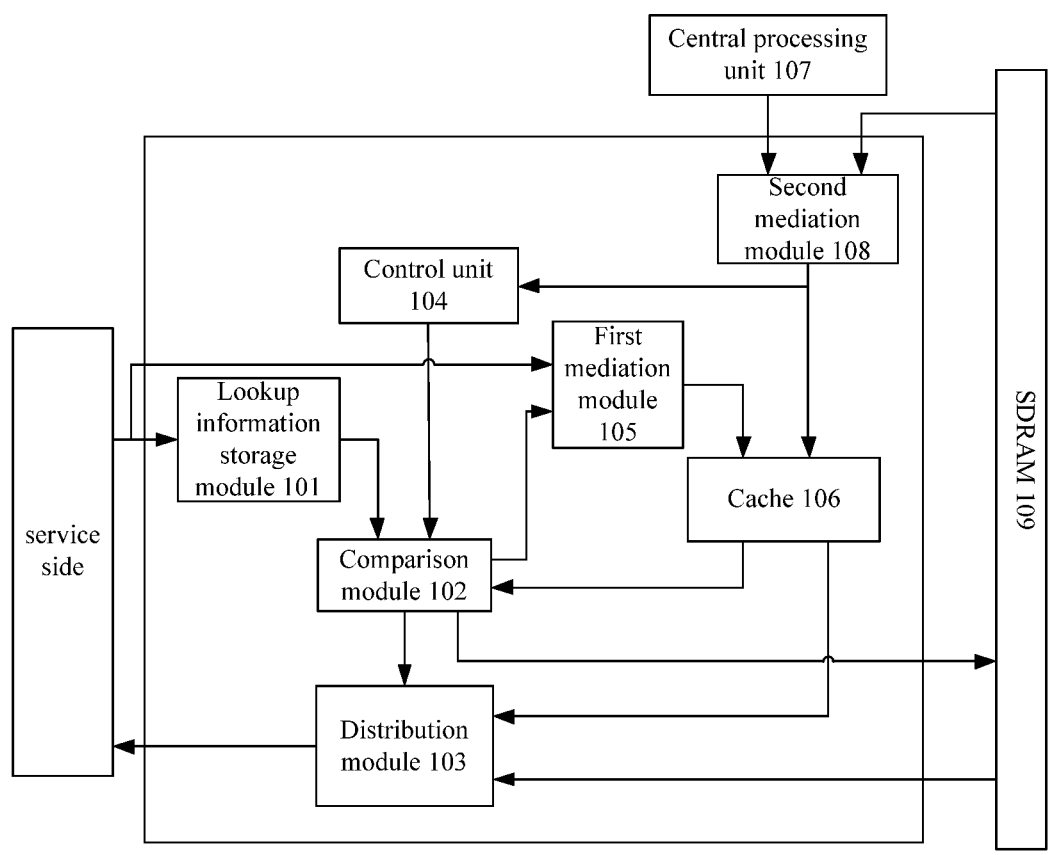
FIG. 1 is a schematic diagram of an item atomic operation and a device for improving an off-chip memory looking up width according to an embodiment of the disclosure.

The implementation of the technical solutions is further elaborated below in combination with the accompanying drawings.

A device for improving an item access bandwidth and atomic operation provided by the disclosure includes: a comparison module, a cache, and a distribution module, herein the comparison module is arranged to: after a lookup request is received from a service side, determine whether an address pointed to by the lookup request is identical to an item address stored in the cache; if they are identical, and a valid identifier vld is currently valid, directly return item data stored in the cache to the service side without initiating a request for looking up an off-chip memory, so as to reduce accessing the off-chip memory; and if they are not identical, initiate a request for looking up the off-chip memory, so as to process, according to a preset rule, item data returned by the off-chip memory in such a way that an atomic operation existed in item updating can realize a seamless and faultless lookup in an item lookup process;

the cache is arranged to store the item data and the item address; and the distribution module is arranged to identify whether the data to be returned to the service side is the item data in the cache or the item data in the off-chip memory, and then return the data to the service side.

In an implementation mode of the disclosure, the comparison module is further arranged to determine, according to the first preset rule, whether the address pointed to by the lookup request is identical to the address stored in the cache, including any one of the following ways:

way 1: if the vld corresponding to a low first-threshold-M bit address is completely valid, and the high second-threshold-N bit address is identical to the address stored in the cache, returning data in the cache to the service side, and not updating the data in the cache; if the addresses are not identical, not updating the data in the cache, and sending the data returned by the off-chip memory to the service side;

way 2: if the vld corresponding to the low first-threshold-M bit address is partially valid, not updating the data in the cache, and sending the data returned by the off-chip memory to the service side; and way 3: if the vld corresponding to the low first-threshold-M bit address is invalid, updating the data in the cache, and sending the data returned by the off-chip memory to the service side;

herein both M and N are natural numbers, and the sum of M and N is a bit width requested by the service side.

In an implementation mode of the disclosure, the device further includes:

a first mediation module arranged to perform mediation between writing data into the cache by a central processing unit and writing the item data returned by the off-chip memory into the cache;

a control module arranged to manage vld bits and determine when to initiate an update operation on the off-chip memory; and a central processing unit arranged to configure a service item, and for the case of single-burst item update, give an instruction of writing a single-burst item; the central processing unit is arranged to, after the mediation by the first mediation module, write the high second-threshold-N bit address of the item or the item data into the cache by taking the low first-threshold-M bit address as an address, set a vld register corresponding to the address through the control module, and give an instruction of updating the off-chip memory to complete the item update; herein both M and N are natural numbers, and the sum of M and N is the bit width requested by the service side.

In an implementation mode of the disclosure, the device further includes:

the first mediation module arranged to perform mediation between writing, by the central processing unit, data into the cache and writing the item data returned by the off-chip memory into the cache;

the control module arranged to manage the vld bits and determine when to initiate the update operation on the off-chip memory;

the central processing unit arranged to configure the service item, and for the case of multiple-burst item update, give an instruction of writing a multiple-burst item; after the mediation by the first mediation module, the first burst writes the high second-threshold-N bit address of the item or the item data into the cache by taking a value obtained by left shifting the low first-threshold-M bit address for 2^S bits as an address, the vld corresponding to the address is set to 0 through the control module, and the instruction of updating the off-chip memory is not given; the second burst writes the high second-threshold-N bit address of the item or the item data into the cache by taking the value obtained by left shifting the low first-threshold-M bit address for 2^S bits plus 1 as an address; the vld corresponding to the address is set to 0 through the control module, and the instruction of updating the off-chip memory is not given; at the same time, the vld of the first burst is set to 1, and an instruction of updating a vld item is given; by analogy, when the address of the penultimate burst returned by the off-chip memory matches the address, obtained by left shifting the low first-threshold-M bit address for 2^S bit, +S−2, the vld corresponding to the last burst is set to 1, and the instruction of updating the off-chip memory is given to complete the item update; herein both M and N are natural numbers, and the sum of M and N is the bit width requested by the service side.

In an implementation mode of the disclosure, the device further includes:

a lookup information storage module arranged to store a table lookup request and multiple-burst flag information; the table lookup request includes the item address for table lookup;

the comparison module is further arranged to, for the case of single-burst item, determine whether the vld corresponding to the low first-threshold-M bit address of the lookup request is valid, and if it is valid, initiate a lookup of the cache by using the low first-threshold-M bit address of the lookup request, and obtain a lookup result; the comparison module is further arranged to parse the lookup result, compare the found address with the high second-threshold-N bit address of the lookup request, and if they are identical, directly return the result from cache lookup to the service side through the distribution module, not initiate the request for looking up the off-chip memory, and read and discard data in the lookup information storage module; herein both M and N are natural numbers, and the sum of M and N is the bit width requested by the service side; and a second mediation module arranged to perform mediation between reading the cache by the service side and returning reading of the cache by the off-chip memory;

the off-chip memory is arranged to store a lookup item.

In an implementation mode of the disclosure, the device further includes:

the lookup information storage module arranged to store a table lookup request and multiple-burst sign information; the table lookup request includes the item address for table lookup;

the comparison module is further arranged to, for the case of multiple-burst item, and when there are 2^S multiple-burst items, determine through the control module whether the vlds corresponding to 2^S contiguous addresses after the low first-threshold-M bit address of the lookup request is left shifted for S bits are valid, and all of them are valid, continuously initiate 2^S requests for looking up the cache after the low first-threshold-M bit address of the lookup quest is left shifted for S bits, and obtain a lookup result; the comparison module is further arranged to parse the lookup result, compare the found address with the high second-threshold-N bit address of the lookup request, and if they are identical, directly return the spliced results from cache lookup to the service side, not initiate the request for looking up the off-chip memory, and read and discard the data in the lookup information storage module; herein both M and N are natural numbers, and the sum of M and N is the bit width requested by the service side; S is a natural number;

the second mediation module arranged to perform mediation between reading the cache by the service side and returning reading of the cache by the off-chip memory;

the off-chip memory is arranged to store the lookup item.

In an implementation mode of the disclosure, the comparison module is further arranged to, when the lookup request matches none of the addresses in the cache, initiate the request for looking up the off-chip memory, and after the item data is returned, take the item address and multiple-burst information out from the lookup information storage module; for the case of single-burst item, the comparison module is further arranged to determine through the control module whether the vld corresponding to the low first-threshold-M bit address of the address is valid, and if it is valid, read the cache after the mediation of the second mediation module, compare the high second-threshold-N bits of the acquired address with the high second-threshold-N bits of the taken-out address; if they match, the comparison module is further arranged to replace the data of the corresponding address with the item data returned from the off-chip memory and write the data back into the cache, and return the data to the service side through the distribution module.

In an implementation mode of the disclosure, the comparison module is further arranged to, when the lookup request matches none of the addresses in the cache, initiate the request for looking up the off-chip memory, and after the item data is returned, take the item address and multiple-burst information out from the lookup information storage module; for the case of multiple-burst item, the comparison module is further arranged to first determine through the control module whether the vlds corresponding to $2^S$ contiguous addresses after the low first-threshold-M bit address of the address is left shifted for S bits are valid, and all of them are valid, read the cache after the mediation of the second mediation module, and compare the high second-threshold-N bits of the acquired address with the high second-threshold-N bits of the taken-out address; if they match, the comparison module is further arranged to replace the data of the corresponding address with the item data returned from the off-chip memory and write the data back into the cache, and return the data to the service side through the distribution module.

In an implementation mode of the disclosure, the comparison module is further arranged to, when the lookup request is received, according to a multiple-burst identifier carried in the lookup request, determine through the control module whether the vld corresponding to $2^S$ contiguous requests after the low first-threshold-M bit address of a service request is left shifted for S bits is valid, and if it is valid, read the data of the corresponding cache, and determine whether the high second-threshold-N bit address of the service request matches the address in the cache; the comparison module is further arranged to, if they match, directly return the data to the service side, and if they do not match, initiate the request for looking up the off-chip memory.

In an implementation mode of the disclosure, the comparison module is further arranged to, after the item data is returned, read the lookup information storage module to acquire a lookup request address and a multiple-burst identifier, determine through the control module whether the vld corresponding to $2^S$ contiguous requests after the low first-threshold-M bit address of the service request is left shifted for S bits is valid, and if it is valid, read the data of the corresponding cache, and determine whether the high second-threshold-N bit address of the service request matches a service address returned to the cache; the comparison module is further arranged to, if they match, return the item data in the cache to the service side through the distribution module, not update the item data in the cache, and if they do not match, directly return the item data in the off-chip memory to the service side through the distribution module, and update the item data in the cache; if a part of the vlds corresponding to the multiple bursts are valid, which indicates that the item update is not completed, the comparison module is further arranged to return the item data in the off-chip memory to the service side through the distribution module, and not update the item data in the cache.

A method for improving an item access bandwidth and atomic operation includes the following steps:

S11: after a lookup request is received from a service side, it is determined whether the address pointed to by the lookup request is identical to the item address stored in the cache;

S12: if they are identical, and the valid identifier vld is currently valid, the item data stored in the cache is directly returned to the service side without initiating the request for looking up the off-chip memory, so as to reduce accessing the off-chip memory;

S13: if they are not identical, the request for looking up the off-chip memory is initiated, so as to process, according to the preset rule, the item data returned by the off-chip memory in such a way that the atomic operation existed in item updating can realize the seamless and faultless lookup in the item lookup process.

In an implementation mode of the disclosure, the first preset rule is used for determining whether the address pointed to by the lookup request is identical to the address stored in the cache, including any one of the following ways:

way 1: if a vld corresponding to a low first-threshold-M bit address is completely valid, and the high second-threshold-N bit address is identical to the address stored in the cache, returning data in the cache to the service side, and not updating the data in the cache; if the addresses are not identical, not updating the data in the cache, and sending the data returned by the off-chip memory to the service side;

way 2: if the vld corresponding to the low first-threshold-M bit address is partially valid, not updating the data in the cache, and sending the data returned by the off-chip memory to the service side; and way 3: if the vld corresponding to the low first-threshold-M bit address is invalid, updating the data in the cache, and sending the data returned by the off-chip memory to the service side;

herein both M and N are natural numbers, and the sum of M and N is the bit width requested by the service side.

In an implementation mode of the disclosure, the method further includes that:

the central processing unit configures the service item, and for the case of single-burst item update, gives an instruction of writing the single-burst item;

after the mediation by the first mediation module, the high second-threshold-N bit address of the item or the item data is written into the cache by taking the low first-threshold-M bit address as an address, the vld register corresponding to the address is set through the control module, and an instruction of updating the off-chip memory is given to complete the item update; herein both M and N are natural numbers, and the sum of M and N is the bit width requested by the service side.

In an implementation mode of the disclosure, the method further includes that:

the central processing unit configures the service item, and for the case of multiple-burst item update, gives an instruction of writing the multiple-burst item;

after the mediation by the first mediation module, the first burst writes the high second-threshold-N bit address of the item or the item data into the cache by taking the value obtained by left shifting the low first-threshold-M bit address for $2^S$ bits as an address, sets the vld corresponding to the address to 0 through the control module, and does not give the instruction of updating the off-chip memory;

the second burst writes the high second-threshold-N bit address of the item or the item data into the cache by taking the value obtained by left shifting the low first-threshold-M bit address for $2^S$ bits plus 1 as an address, sets the vld corresponding to the address to 0 through the control module, and does not give the instruction of updating the off-chip memory; at the same time, the second burst sets the vld of the first burst to 1, and gives an instruction of updating the vld item;

by analogy, when the address of the penultimate burst returned by the off-chip memory matches the address, obtained by left shifting the low first-threshold-M bit address for $2^S$ bit, +S−2, the vld corresponding to the last burst is set to 1, and the instruction of updating the off-chip memory is given to complete the item update; herein both M and N are natural numbers, and the sum of M and N is the bit width requested by the service side.

In an implementation mode of the disclosure, the method further includes that:

for the case of single-burst item, the comparison module determines whether the vld corresponding to the low first-threshold-M bit address of the lookup request is valid, if it is valid, initiates a lookup of the cache by using the low first-threshold-M bit address of the lookup request, and obtains a lookup result;

the lookup result is parsed, and the found address is compared with the high second-threshold-N bit address of the lookup request; if they are identical, the result from cache lookup is directly returned to the service side through the distribution module, the request for looking up the off-chip memory is not initiated, and data in the lookup information storage module is read and discarded; herein both M and N are natural numbers, and the sum of M and N is the bit width requested by the service side.

In an implementation mode of the disclosure, the method further includes that:

for the case of multiple-burst item, and when there are $2^S$ multiple-burst items, the comparison module determines through the control module whether the vlds corresponding to $2^S$ contiguous addresses after the low first-threshold-M bit address of the lookup request is left shifted for S bits are valid; if all of them are valid, the comparison module continuously initiates $2^S$ requests for looking up the cache after left shifting the low first-threshold-M bit address of the lookup quest for S bits, and obtains a lookup result;

the lookup result is parsed, and the found address is compared with the high second-threshold-N bit address of the lookup request; if they are identical, the spliced results from cache lookup are directly returned to the service side, the request for looking up the off-chip memory is not initiated, and the data in the lookup information storage module is read and discarded; herein both M and N are natural numbers, and the sum of M and N is the bit width requested by the service side; S is a natural number.

In an implementation mode of the disclosure, the method further includes that:

when the lookup request matches none of the addresses in the cache, the comparison module initiates the request for looking up the off-chip memory, and after the item data is returned, takes the item address and multiple-burst information out from the lookup information storage module;

for the case of single-burst item, it is determined through the control module whether the vld corresponding to the low first-threshold-M bit address of the address is valid; if it is valid, the cache is read after the mediation of the second mediation module, and the high second-threshold-N bits of the acquired address is compared with the high second-threshold-N bits of the taken-out address; if they match, the data of the corresponding address is replaced with the item data returned from the off-chip memory and the data is written back into the cache, and the data is returned to the service side through the distribution module.

In an implementation mode of the disclosure, the method further includes that:

when the lookup request matches none of the addresses in the cache, the comparison module initiates the request for looking up the off-chip memory, and after the item data is returned, takes the item address and multiple-burst information out from the lookup information storage module;

for the case of multiple-burst item, first it is determined through the control module whether the vlds corresponding to $2^S$ contiguous addresses after the low first-threshold-M bit address of the address is left shifted for S bits are valid; if all of them are valid, the cache is read after the mediation of the second mediation module, and the high second-threshold-N bits of the acquired address is compared with the high second-threshold-N bits of the taken-out address; if they match, the data of the corresponding address is replaced with the item data returned from the off-chip memory and the data is written back into the cache, and the data is returned to the service side through the distribution module.

In an implementation mode of the disclosure, the method further includes that:

when the lookup request is received, the comparison module determines through the control module whether the vld corresponding to $2^S$ contiguous requests after the low first-threshold-M bit address of the service request is left shifted for S bits is valid according to the multiple-burst identifier carried in the lookup request; if it is valid, the data of the corresponding cache is read, and it is determined whether the high second-threshold-N bit address of the service request matches the address in the cache; if they match, the data is directly returned to the service side; if they do not match, the request for looking up the off-chip memory is initiated.

In an implementation mode of the disclosure, the method further includes that:

after the item data is returned, the comparison module reads the lookup information storage module to acquire the lookup request address and the multiple-burst identifier;

it is determined through the control module whether vld corresponding to $2^S$ contiguous requests after the low first-threshold-M bit address of the service request is left shifted for S bits is valid; if all of them are valid, the data of the corresponding cache is read; it is determined whether the high second-threshold-N bit address of the service request matches a service address returned to the cache; if they match, the item data in the cache is returned to the service side through the distribution module, and the item data in the cache is not updated; if they do not match, the item data in the off-chip memory is directly returned to the service side through the distribution module, at the same time, the item data in the cache is updated; if the vld corresponding to the multiple-burst is partially valid, which indicates that the item update is not completed, the item data in the off-chip memory is returned to the service side through the distribution module, and the item data in the cache is not updated.

The disclosure is elaborated below by taking a practical application scenario for example.

An application scenario of item management is that: the item management is performed based on a Synchronous Dynamic Random-Access Memory (SDRAM); because an NP is applied to different situations, and types of lookup, item capacities, sizes of item entry and requirements on a table lookup performance have great difference, on one hand, it is needed to ensure that data is completely new or completely old during the item atomic operation of the NP, so as to achieve an objective of seamless and faultless lookup; on the other hand, it is needed to improve the access bandwidth during lookup, so as to achieve an objective of effective item management.

For this application scenario, the prior art, using the structure characteristic of the memory as a starting point, performs multi-band duplications or reduces line feed operations; that is, it is needed to change the structure of the off-chip memory; however, the application scenario, adopting the disclosure, starts from reducing accessing the external memory SDRAM to improve a lookup width without changing the structure of the off-chip memory; it is an efficient item management solution, which not only improves a lookup performance of the external memory SDRAM, but also overcomes the problem of the atomic operation existed in item updating in a multiple-burst item lookup process in such a way that in an item update process, the objective of ensuring a seamless and faultless lookup is achieved. Moreover, because this application scenario adopts the disclosure, there is no need to change the structure of the off-chip memory, so it is more convenient and flexible on design and use, and the manufacturing cost is low.

Figure 2:
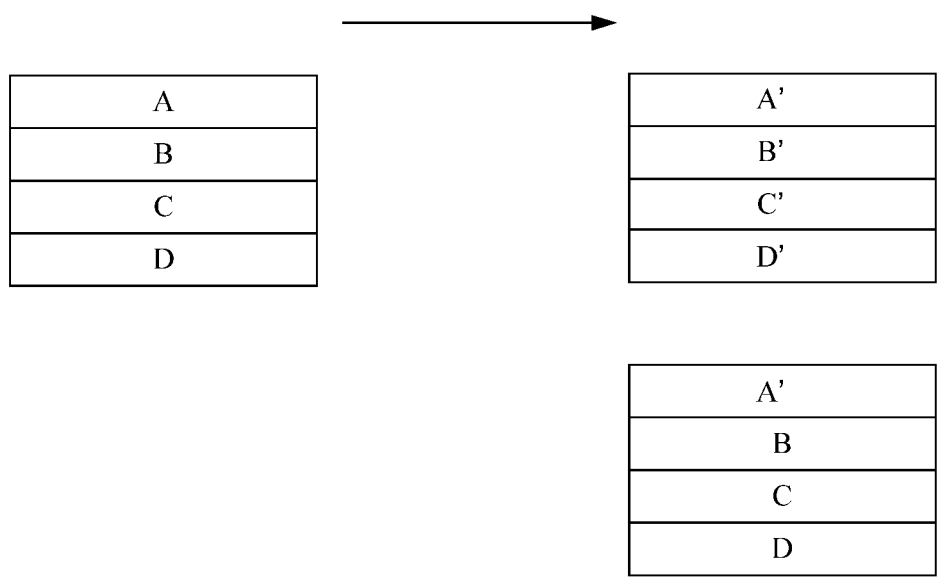
FIG. 2 is a schematic diagram of illustrating an item atomic operation according to an embodiment of the disclosure.

Note that, this application scenario includes different situations of updating the single-burst item and the multiple-burst item, which will be elaborated subsequently;

the involved technical terms are described below:

1) the single-burst item is that item entries need to be stored in a single address of the memory, and the item result is obtained directly according to the lookup request during a table lookup process;

2) the multiple-burst item is that item entries need to be stored in multiple addresses of the memory, and an item management module needs to convert, during a table lookup process, the single lookup request into multiple lookup requests to obtain the item result;

3) the item atomic operation is that: as shown in FIG. 2, in the process of updating the multiple-burst item, a reading operation may be included in an operation process of writing the multiple-burst item, which causes the returned item results to appear alternately; for example, when operations are performed on the addresses A, B, C and D, the obtained returned results are: A', B, C, and D, and this is a situation where the returned item results to appear alternately; herein A' is a new value, and B, C, and D are old values; the atomic operation is looking up to obtain the item results which are all old values or all new values, and ensuring a seamless or faultless lookup; for example, when operations are performed on the addresses A, B, C and D, the obtained returned results are: A', B', C', and D', and this is a situation where the item results are all new values.

This application scenario adopts the device of the disclosure, which is specifically advice for efficiently improving an item access bandwidth and atomic operation of the off-chip memory; as shown in FIG. 1, the device mainly includes: the lookup information storage module 101, the comparison module 102, the control module 104, the second mediation module 105, the first mediation module 108, the distribution module 103, the cache 106 and the SDRAM 109.

The lookup information storage module 101 is arranged to store a table lookup address and multiple-burst flag information.

The comparison module 102 is arranged to: when the service side initiates a lookup request, and the lookup request is received, determine whether the address of the lookup request is identical to the address stored in the cache; and if they are identical and the vld is valid, directly return the item stored in the cache to the service through the distribution module 103 without initiating a request for looking up the SDRAM 109; or else, it is indicated that the address of the lookup request is not identical to the address stored in the cache, it is needed to wait, and a request for looking up the SDRAM 109 is initiated, so as to process according to the returned data; the comparison module 102 is further arranged to, when the SDRAM 109 returns the data, determine whether the address of the lookup request is identical to the address stored in the cache, including the following situations:

1) if the vld corresponding to the low M-bit address is completely valid, and the high N-bit address is identical to the address stored in the cache, the data in the cache 106 is returned to the service side, and the data in the cache 106 is not updated; if the addresses are not identical, the data in the cache 106 is not updated, and the data returned from the SDRAM 109 is sent to the service side; herein both M and N are natural numbers and different values, for representing a threshold, and they need to be set according to actual demands on application; that is, the low M-bit address is a situation about how to process when the address is below the first threshold, e.g. M bits; and the high N-bit address is a situation about how to process when the address is above the second threshold, e.g. N bits;

2) if the vld corresponding to the low M-bit address is partially valid (aiming at the multiple-burst item), the data in the cache 106 is not updated, and the data returned from the SDRAM 109 is sent to the service side;

3) if the vld corresponding to the low M-bit address is invalid, the data in the cache 106 is updated, and the data returned from the SDRAM 109 is sent to the service side.

The distribution module 103 is arranged to identify whether the data to be returned to the service side is the item data in the cache 106 or the item data in the SDRAM 109.

The control module 104 is arranged to manage the vld bits and determine when to initiate the update operation on the off-chip memory. An operation rule of the item update vld is as follows:

1) the central processing unit 107 is arranged to update the item to 1 when writing the single-burst item, and issue an operation of updating the item in the SDRAM 109;

2) the vld of the corresponding address is set to 0 when the multiple-burst item is written in the first burst, and the vld of the corresponding address is set to 0 when the multiple-burst item is written in the second burst; at the same time, the vld corresponding to the burst is set to 1, and an operation of updating the first burst of the item is issued, by analogy. When the address corresponding to the data returned from the external memory SDRAM 109 matches the penultimate burst in the cache, the vld corresponding to the last burst is set to 1 to complete the item update;

3) in other situations, the vld remains unchanged.

The second mediation module 105 is arranged to perform mediation between reading the cache 106 by the service side and returning reading of the cache by the SDRAM 109.

Figure 3:
FIG. 3 is a structure diagram of internal data of a cache according to an embodiment of the disclosure.

The cache 106 is arranged to store the item data and the item address; as shown in FIG. 3, FIG. 3 shows a structure of internal data in the cache applying the disclosure.

The central processing unit 107 is arranged to configure the service item.

The first mediation module 108 is arranged to perform mediation between writing data into the cache 106 by the central processing unit 107 and writing the item data returned by the SDRAM 109 into the cache 106.

The SDRAM 109 is arranged to store the lookup item.

This application adopts the device of the disclosure, specifically a method for efficiently improving an item access bandwidth and atomic operation of the off-chip memory; the method mainly includes the following aspects, all of which include single-burst processing and multiple-burst processing:

1) the process of item update of the central processing unit;

2) the process of improving an SDRAM access bandwidth; and 3) the process of multiple-burst item atomic operation.

1. For the processing of item update of the central processing unit, if it is the single-burst item update, as the processing flow in FIG. 5, first the first mediation module 108 performs mediation, and the item to be updated and the high N bits of the corresponding address are spliced and then written into the low M-bit address of the cache 106; at the same time, the vld of the corresponding low M-bit address is set to 1 through the control module 104, and the operation of updating the item in the SDRAM 109 is issued; if it is the multiple-burst item sent by the central processing unit, as the processing flow in FIG. 6, when the first burst item is updated, the operation is the same as the operation of the single-burst item, and the difference is that the vld of the corresponding low M-bit address is set to 0 through the control module 104, and the operation of updating the item is not issued; when the central processing unit issues the second burst item update, the implementation process is the same as the processing of the first burst, at this point, the vld corresponding to the last burst is set to 1, and the operation of updating the last item in the SDRAM 109 is issued. By analogy, when the address corresponding to the item returned by the SDRAM 109 is identical to the address of the penultimate burst item of the multiple-burst item, the last burst item is updated to the SDRAM 109, so as to complete the multiple-burst item update.

2. For the processing of improving the SDRAM access bandwidth, as shown in FIG. 1, if the request sent from the service side is received, the table lookup request and the multiple-burst identifier are stored in the lookup information storage module 101; for the single-burst item, it is first determined whether the vld corresponding to the low M-bit address of the lookup request is valid; if so, a request for looking up the cache 106 is initiated by using the lookup request, and the lookup result is obtained; the comparison module compares the found address with the high N-bit address of the lookup request of the service side; if they are identical, the result from cache lookup 106 is directly returned to the service side through the distribution module 103, and the request for looking up the off-chip memory is not initiated, at the same time, the data in the lookup information storage module 101 is read and discarded; for the multiple-burst item (e.g. 2^S bursts), first it is determined through the control module 104 whether the vlds corresponding to 2^S contiguous addresses after the low M bits in the lookup request are left shifted for S bits are valid, if all of them are valid, 2^S requests for looking up the cache are continuously initiated after the low M bits of the lookup quest are left shifted for S bits, and a lookup result is obtained; the comparison module 102 compares the found address with the high N-bit address of the lookup request of the service side; if they are identical, the spliced results from cache lookup 106 are directly returned to the service side through the distribution module 103, and the request for looking up the off-chip memory is not initiated; at the same time, the data in the lookup information storage module 101 is read and discarded.

When the lookup request of the service side matches none of the addresses in the cache 106, the request for looking up the SDRAM 109 is initiated; and after the item data is returned, the item address and multiple-burst information is taken out from the lookup information storage module 101; for the case of single-burst item, it is determined through the control module 104 whether the vld corresponding to the low M-bit address is valid; if it is valid, the cache 106 is read after the mediation of the second mediation module 105, and the high N bits of the acquired address are acquired and compared, through the comparison module 102, with the high N bits of the taken-out address of the lookup information storage module 101; if they match, the data of the corresponding address is replaced with the item data returned from the SDRAM 109 and the data is written back into the cache 106; at the same time, the data is returned to the service side through the distribution module 103; for the case of multiple-burst item, first it is determined through the control module 104 whether the vlds corresponding to 2^S contiguous addresses after the low of the address is left shifted for S bits are valid; if all of them are valid, the cache 106 is read after the mediation of the second mediation module 105, the subsequent operation is the same as the case of single-burst item.

The item result corresponding to the received lookup request of the service side has been stored in the cache 106, and the lookup result in the cache 106 is returned to the service side through the distribution module 103; at the same time, the request for accessing the external memory SDRAM 109 is not initiated, thereby improving an item lookup bandwidth.

3. For the processing of multiple-burst item atomic operation, as shown in FIG. 1, if the lookup request is received from the service side, it is determined through the control module 104 whether the vld corresponding to 2^S contiguous requests after the low first-threshold-M bit address of the service request is left shifted for S bits is valid according to the multiple-burst identifier carried in the lookup request; if it is valid, the data of the corresponding cache 106 is read, and the comparison module 102 determines whether the high N-bit address of the service request matches the address in the cache 106; if they match, the data is directly returned to the service side; if they do not match, the request for looking up the external memory SDRAM 109 is initiated. After the item data is returned, the lookup information storage module 101 to acquire the lookup request address and the multiple-burst identifier; it is determined through the control module 104 whether vld corresponding to 2^S contiguous requests after the low M-bit address of the service request is left shifted for S bits is valid; if all of them are valid, the data of the corresponding cache 106 is read; the comparison module 102 determines whether the high N-bit address of the service request matches the service address returned to the cache 106; if they match, the item data in the cache 106 is returned to the service side through the distribution module 103, and the item data in the cache 106 is not updated; if they do not match, the item data in the SDRAM 109 is directly returned to the service side through the distribution module 103, at the same time, the item data in the cache 106 is updated; if the vld corresponding to the multiple-burst is partially valid, which indicates that the item update is not completed, the item data in the SDRAM 109 is returned to the service side through the distribution module 103, and the item data in the cache 106 is not updated.

Figure 4:
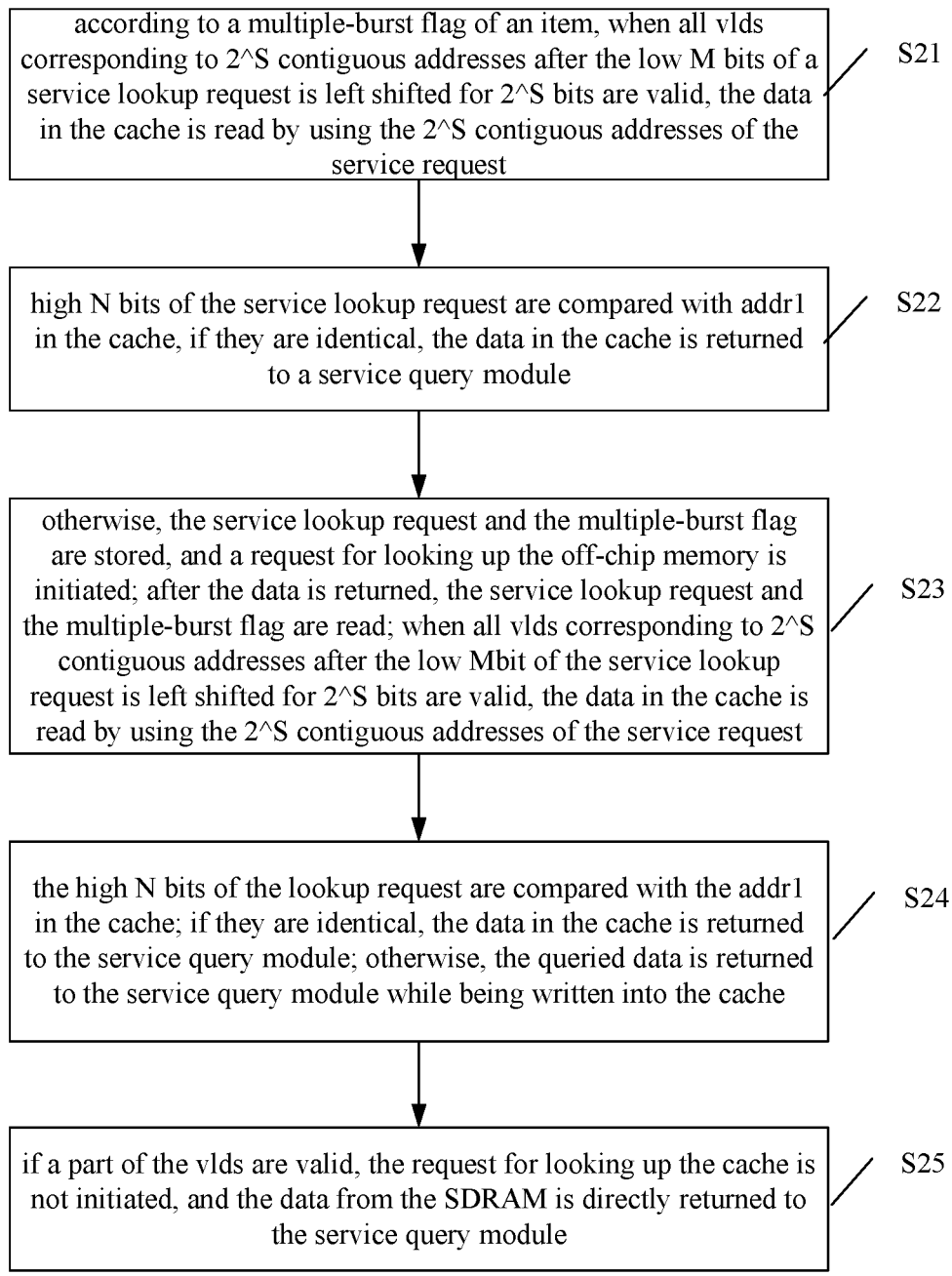
FIG. 4 is a flowchart of improving an item lookup width performance and an item atomic operation according to an embodiment of the disclosure.

Corresponding to the above description, FIG. 4 is a flowchart of improving an item lookup width performance and an item atomic operation according to an embodiment of the disclosure; the flow is a complete principle flow, including the following steps.

In step S21, according to a multiple-burst flag of an item, when all vlds corresponding to $2^S$ contiguous addresses after the low M bits of a service lookup request is left shifted for $2^S$ bits are valid, the data in the cache is read by using the $2^S$ contiguous addresses of the service request;

In step S22, high N bits of the service lookup request are compared with addr1 in the cache, if they are identical, the data in the cache is returned to a service query module;

In step S23, otherwise, the service lookup request and the multiple-burst flag are stored, and the request for looking up the off-chip memory is initiated; after the data is returned, the service lookup request and the multiple-burst flag are read; when all vlds corresponding to $2^S$ contiguous addresses after the low M bits of the service lookup request is left shifted for $2^S$ bits are valid, the data in the cache is read by using the $2^S$ contiguous addresses of the service request;

In step S24, the high N bits of the lookup request are compared with the addr1 in the cache; if they are identical, the data in the cache is returned to the service query module; otherwise, the queried data is returned to the service query module while being written into the cache; and In step S25, if a part of the vlds are valid, the request for looking up the cache is not initiated, and the data from the SDRAM is directly returned to the service query module.

Figure 5:
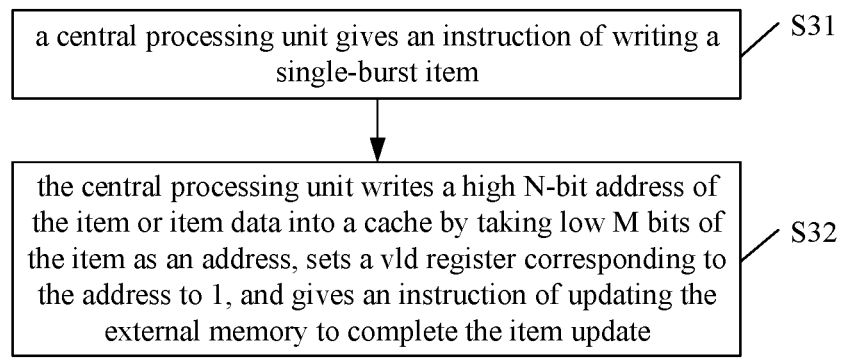
FIG. 5 is a flowchart of updating a single-burst item according to an embodiment of the disclosure.

Corresponding to the above description, FIG. 5 is a flowchart of updating a single-burst item according to an embodiment of the disclosure, including the following steps.

Figure 6:
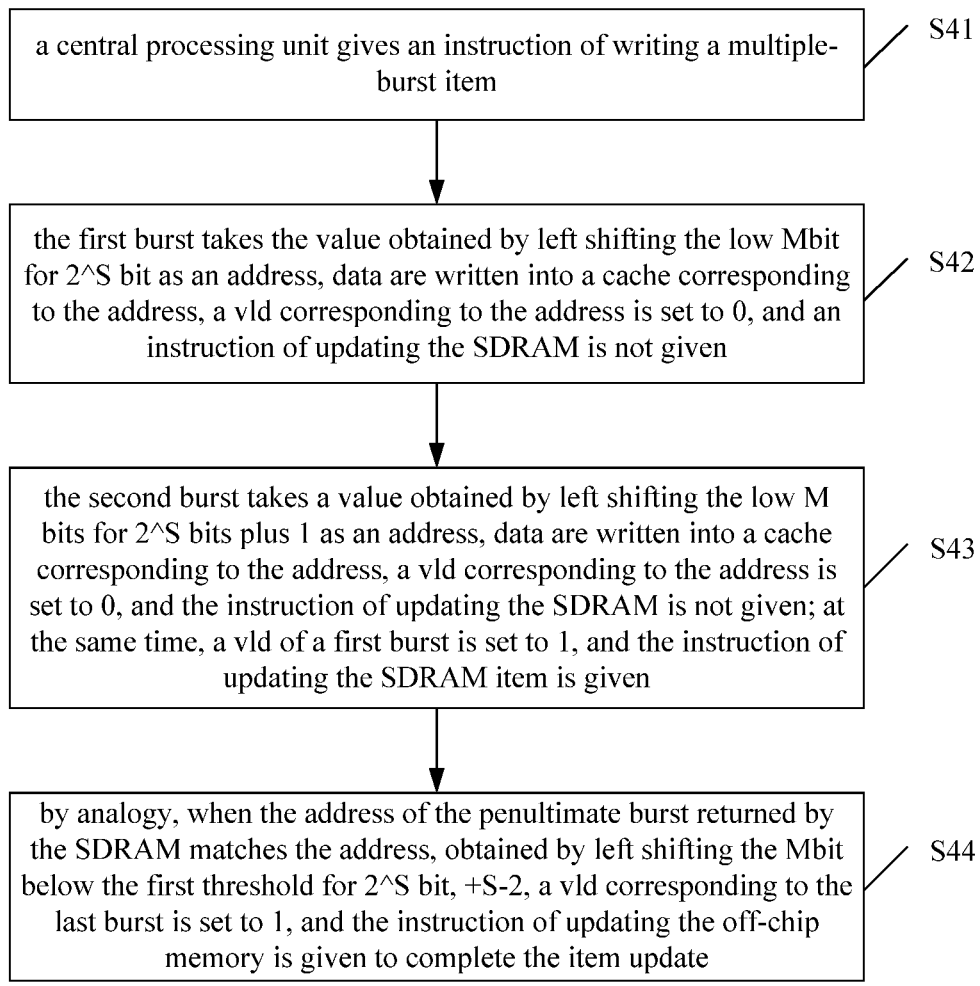
FIG. 6 is a flowchart of updating a multiple-burst item according to an embodiment of the disclosure.

In step S31, a central processing unit gives an instruction of writing a single-burst item; and In step S32, the central processing unit writes a high N-bit address of the item or item data into a cache by taking low M bits of the item as an address, sets a vld register corresponding to the address to 1, and gives an instruction of updating the external memory to complete the item update;

Corresponding to the above description, FIG. 6 is a flowchart of updating a multiple-burst item according to an embodiment of the disclosure, including the following steps.

In step S41, a central processing unit gives an instruction of writing a multiple-burst item;

In step S42, the first burst takes the value obtained by left shifting the low M bits for $2^S$ bits as an address, data are written into a cache corresponding to the address, a vld corresponding to the address is set to 0, and an instruction of updating the SDRAM is not given;

In step S43, the second burst takes a value obtained by left shifting the low M bits for $2^S$ bits plus 1 as an address, data are written into a cache corresponding to the address, the vld corresponding to the address is set to 0, and the instruction of updating the SDRAM is not given; at the same time, a vld of a first burst is set to 1, and the instruction of updating the SDRAM item is given;

In step S44, by analogy, when the address of the penultimate burst returned by the SDRAM matches the address, obtained by left shifting the low first-threshold-M bit address for $2^S$ bit, +S−2, a vld corresponding to the last burst is set to 1, and the instruction of updating the off-chip memory is given to complete the item update.

In a word, by adopting the solution for efficiently improving an item access bandwidth and atomic operation of the SDRAM of the disclosure, this application scenario overcomes the problem of the atomic operation existed in item updating in a multiple-burst item lookup process in such a way that in an item update process, the objective of ensuring a seamless and faultless lookup is achieved. At the same time, because the item data stored in the cache is directly returned by the cache in the lookup process without initiating the requesting for reading the SDRAM, the lookup performance of the SDRAM is improved; the solution is simple and flexible, so it can be widely applied to other managements of single-burst or multiple-burst items.

If the integrated modules of the disclosure are implemented by software function modules, and the software function modules are sold or used as independent products, they can also be stored in a computer readable storage medium. Based on this understanding, the technical solutions in the embodiments of the disclosure substantially or the part making a contribution to the traditional art can be embodied in the form of software product; the computer software product is stored in a storage medium and includes a number of instructions to make a computer device (which can be a personal computer, a server or a network device, etc.) perform all or part of the method in each embodiment of the disclosure. The above storage medium includes: a USB flash disk, a mobile hard disk, an ROM, a magnetic disk or a compact disc, and other media which can store program codes. In this way, the disclosure is not limited to any particular combination of hardware and software.

Correspondingly, the disclosure also provides a computer storage medium, in which a computer executable instruction is stored; the computer executable instruction is arranged to perform the method for improving an item access bandwidth and atomic operation.

The above is only the preferred embodiment of the disclosure and not intended to limit the protection scope of the disclosure.

INDUSTRIAL APPLICABILITY

By applying the disclosure, because it is not always needed to initiate the request for looking up the off-chip memory, the number of accesses to the off-chip memory is reduced, and a looking up bandwidth is reduced; moreover, the item data returned by the off-chip memory is processed according to the preset rule, as such, the atomic operation existed in item updating can realize a seamless and faultless lookup in an item lookup process.

The invention claimed is:

1. A device for improving an item access bandwidth and atomic operation, comprising:
a memory storing processor-executable instructions; and
a processor arranged to execute the stored processor-executable instructions to perform steps of:
after a lookup request is received from a service side, determining whether an address pointed to by the lookup request is identical to an item address stored in a cache;
if they are identical, and a valid identifier vld is currently valid, directly returning item data stored in the cache to the service side without initiating a request for looking up an off-chip memory, so as to reduce accessing the off-chip memory; and
if they are not identical, initiating a request for looking up the off-chip memory, and process, according to a preset rule, item data returned by the off-chip memory in such a way that an atomic operation existed in item updating can realize a seamless and faultless lookup in an item lookup process, wherein the preset rule is used for determining whether the address pointed to by the lookup request is identical to the item address stored in the cache, comprising any one of the following ways:

way 1: if a vld corresponding to a low first-threshold-M bit address is completely valid, and a high second-threshold-N bit address is identical to the item address stored in the cache, returning data in the cache to the service side, and not updating the data in the cache, where if the addresses are not identical, not updating the data in the cache, and sending the data returned by the off-chip memory to the service side;

way 2: if the vld corresponding to the low first-threshold-M bit address is partially valid, not updating the data in the cache, and sending the data returned by the off-chip memory to the service side; and way 3: if the vld corresponding to the low first-threshold-M bit address is invalid, updating the data in the cache, and sending the data returned by the off-chip memory to the service side, and wherein both M and N are natural numbers, and a sum of M and N is a bit width requested by the service side.

2. The device according to claim 1, wherein the processor is arranged to execute the stored processor-executable instructions to further perform steps of:

configuring a service item, and for the case of single-burst item update, giving an instruction of writing a single-burst item; and after mediation by a first mediation module, writing a high second-threshold-N bit address of the service item or the item data into the cache by taking low first-threshold-M bit address as an address, setting a vld register corresponding to the address to 1 through a control module, and giving an instruction of updating the off-chip memory to complete the item update.

3. The device according to claim 2, wherein the processor is arranged to execute the stored processor-executable instructions to further perform steps of:

for the case of single-burst item, determining whether the vld corresponding to the low first-threshold-M bit address of the lookup request is valid, and if it is valid, initiating a lookup of the cache by using a low first-threshold-M bit address of the lookup request, and obtaining a lookup result; and parsing the lookup result, comparing a found address with the high second-threshold-N bit address of the lookup request, and if they are identical, directly returning the result from cache lookup to the service side through a distribution module, not initiating the request for looking up the off-chip memory, and reading and discarding data in a lookup information storage module.

4. The device according to claim 3, wherein the processor is arranged to execute the stored processor-executable instructions to further perform steps of:

when the lookup request matches none of the addresses in the cache, initiating the request for looking up the off-chip memory, and after the item data is returned, taking the item address and multiple-burst information out from the lookup information storage module;

for the case of single-burst item, determining through the control module whether a vld corresponding to a low first-threshold-M bit address of an address is valid, and if it is valid, reading the cache after mediation of a second mediation module, comparing high second-threshold-N bits of an acquired address with high second-threshold-N bits of the item taken-out address; and if they match, replacing data of a corresponding address with the item data returned from the off-chip memory and writing data back into the cache, and returning data to the service side through the distribution module.

5. The device according to claim 1, wherein the processor is arranged to execute the stored processor-executable instructions to further perform steps of:

configuring a service item, and for the case of multiple-burst item update, giving an instruction of writing a multiple-burst item;

after mediation by a first mediation module, writing a high second-threshold-N bit address of the multiple-burst item or the item data into the cache by taking a value obtained by left shifting a low first-threshold-M bit address for 2^S bits as a first particular address, setting a vld corresponding to the first particular address to 0 through a control module, and not giving an instruction of updating the off-chip memory;

for a second burst, writing the high second-threshold-N bit address of the multiple-burst item or the item data into the cache by taking a value obtained by left shifting the low first-threshold-M bit address for 2^S bits plus 1 as a second particular address, setting a vld corresponding to the second particular address to 0 through the control module, not giving the instruction of updating the off-chip memory, at the same time, set a vld of a first burst to 1, and give an instruction of updating a vld item; and by analogy, when an address of a penultimate burst returned by the off-chip memory matches an address, obtained by left shifting a low first-threshold-M bit address for 2^S bit, +S−2, setting an vld corresponding to a last burst to 1, and giving an instruction of updating the off-chip memory to complete the item update.

6. The device according to claim 5, wherein the processor is arranged to execute the stored processor-executable instructions to further perform steps of:

for the case of multiple-burst item, and when there are 2^S multiple-burst items, determining through the control module whether vlds corresponding to 2^S contiguous addresses after a low first-threshold-M bit address of the lookup request is left shifted for S bits are valid, and if all of them are valid, continuously initiating 2^S requests for looking up the cache after the low first-threshold-M bit address of the lookup request is left shifted for S bits, and obtaining a lookup result; and parsing the lookup result, compare a found address with a high second-threshold-N bit address of the lookup request, and if they are identical, directly returning spliced results from cache lookup to the service side through a distribution module, not initiating the request for looking up the off-chip memory, and reading and discarding data in a lookup information storage module, wherein S is a natural number.

7. The device according to claim 6, wherein the processor is arranged to execute the stored processor-executable instructions to further perform steps of:

when the lookup request matches none of the addresses in the cache, initiating the request for looking up the off-chip memory, and after the item data is returned, taking the item address and multiple-burst information out from the lookup information storage module;

for the case of multiple-burst item, firstly determining through the control module whether the vlds corresponding to 2^S contiguous addresses after a low first-threshold-M bit address of an address is left shifted for S bits are valid, and if all of them are valid, reading the cache after mediation of a second mediation module, and comparing high second-threshold-N bits of an acquired address with high second-threshold-N bits of the taken-out item address; and if they match, replacing data of a corresponding address with the item data returned from the off-chip memory and writing data back into the cache, and returning data to the service side through the distribution module.

8. The device according to claim 7, wherein the processor is arranged to execute the stored processor-executable instructions to further perform steps of:

when the lookup request is received, according to a multiple-burst identifier carried in the lookup request, determining through the control module whether vld corresponding to 2^S contiguous requests after a low first-threshold-M bit address of a service request is left shifted for S bits is valid, and if it is valid, reading data of a corresponding cache, and determining whether a high second-threshold-N bit address of the service request matches the address in an cache; and if they match, directly returning data to the service side, and if they do not match, initiating the request for looking up the off-chip memory.

9. The device according to claim 8, wherein the processor is arranged to execute the stored processor-executable instructions to further perform steps of:

after the item data is returned, reading the lookup information storage module to acquire a lookup request address and a multiple-burst identifier;

determining through the control module whether the vld corresponding to 2^S contiguous requests after the low first-threshold-M bit address of the service request is left shifted for S bits is valid, and if it is valid, reading the data of the corresponding cache, and determining whether the high second-threshold-N bit address of the service request matches a service address returned to the cache;

if they match, returning the item data in the cache to the service side through the distribution module, not update the item data in the cache, and if they do not match, directly returning the item data in the off-chip memory to the service side through the distribution module, and updating the item data in the cache; and if a vld corresponding to multiple bursts is partially valid, which indicates that the item update is not completed, returning the item data in the off-chip memory to the service side through the distribution module, and not updating the item data in the cache.

10. A method for improving an item access bandwidth and atomic operation, the method comprising:

after a lookup request is received from a service side, determining whether an address pointed to by the lookup request is identical to an item address stored in a cache;

if they are identical, and a valid identifier vld is currently valid, directly returning item data stored in the cache to the service side without initiating a request for looking up an off-chip memory, so as to reduce accessing the off-chip memory; and if they are not identical, initiating a request for looking up the off-chip memory, and processing, according to a preset rule, item data returned by the off-chip memory in such a way that an atomic operation existed in item updating can realize a seamless and faultless lookup in an item lookup process, wherein the preset rule is used for determining whether the address pointed to by the lookup request is identical to the item address stored in the cache, comprising any one of the following ways:

way 1: if a vld corresponding to a low first-threshold-M bit address is completely valid, and a high second-threshold-N bit address is identical to the item address stored in the cache, returning data in the cache to the service side, and not updating the data in the cache; if the addresses are not identical, not updating the data in the cache, and sending the data returned by the off-chip memory to the service side;

way 2: if the vld corresponding to the low first-threshold-M bit address is partially valid, not updating the data in the cache, and sending the data returned by the off-chip memory to the service side; and way 3: if the vld corresponding to the low first-threshold-M bit address is invalid, updating the data in the cache, and sending the data returned by the off-chip memory to the service side, and wherein both M and N are natural numbers, and a sum of M and N is a bit width requested by the service side.

11. The method according to claim 10, further comprising:

configuring, by a central processing unit, a service item, and for the case of single-burst item update, giving an instruction of writing a single-burst item; and after mediation by a first mediation module, writing a high second-threshold-N bit address of the service item or the item data into the cache by taking the low first-threshold-M bit address as an address, setting a vld register corresponding to the address to 1 through a control module, and giving an instruction of updating the off-chip memory to complete the item update.

12. The method according to claim 11, further comprising:

for the case of single-burst item, determining, by a comparison module, whether the vld corresponding to the low first-threshold-M bit address of the lookup request is valid, if it is valid, initiating a lookup of the cache by using a low first-threshold-M bit address of the lookup request, and obtaining a lookup result;

parsing the lookup result, and comparing a found address with the high second-threshold-N bit address of the lookup request; and if they are identical, directly returning the result from cache lookup to the service side through a distribution module, not initiating the request for looking up the off-chip memory, and reading and discarding data in a lookup information storage module.

13. The method according to claim 12, further comprising:

when the lookup request matches none of the addresses in the cache, initiating, by the comparison module, the request for looking up the off-chip memory, and after the item data is returned, taking the item address and multiple-burst information out from the lookup information storage module;

for the case of single-burst item, determining through the control module whether a vld corresponding to a low first-threshold-M bit address of an address is valid;

if it is valid, reading the cache after mediation of a second mediation module, and comparing high second-threshold-N bits of an acquired address with high second-threshold-N bits of the taken-out item address; and if they match, replacing data of a corresponding address with the item data returned from the off-chip memory and writing data back into the cache, and returning data to the service side through the distribution module.

14. The method according to claim 10, further comprising:

configuring, by a central processing unit, a service item, and for the case of multiple-burst item update, giving an instruction of writing a multiple-burst item;

after mediation of by a first mediation module, writing, by a first burst, a high second-threshold-N bit address of the multiple-burst item or the item data into the cache by taking a value obtained by left shifting a low first-threshold-M bit address for 2^S bits as a first particular address, setting the vld corresponding to the first particular address to 0 through a control module, and not giving the instruction of updating the off-chip memory;

for a second burst, writing the high second-threshold-N bit address of the multi-burst item or the item data in the cache by taking a value obtained by left shifting the low first-threshold-M bit address for 2^S bits plus 1 as a second particular address, setting a vld corresponding to the second particular address to 0 through the control module, and not giving the instruction of updating the off-chip memory;

at the same time, setting a vld of the first burst to 1, and giving an instruction of updating a vld item; and by analogy, when an address of a penultimate burst returned by the off-chip memory matches an address, obtained by left shifting a low first-threshold-M bit address for 2^S bit, +S−2, setting an vld corresponding to a last burst to 1, and giving the instruction of updating the off-chip memory to complete the item update.

15. The method according to claim 14, further comprising:

for the case of multiple-burst item, and when there are 2^S multiple-burst items, determining through the control module, by a comparison module, whether vlds corresponding to 2^S contiguous addresses after a low first-threshold-M bit address of the lookup request is left shifted for S bits are valid;

if all of them are valid, continuously initiating 2^S requests for looking up the cache after left shifting the low first-threshold-M bit address of the lookup request for S bits, and obtaining a lookup result;

parsing the lookup result, and comparing a found address with a high second-threshold-N bit address of the lookup request; and if they are identical, directly returning spliced results from cache lookup to the service side, not initiating the request for looking up the off-chip memory, and reading and discarding the data in a lookup information storage module, wherein S is a natural number.

16. The method according to claim 15, further comprising:

when the lookup request matches none of the addresses in the cache, initiating, by the comparison module, the request for looking up the off-chip memory, and after the item data is returned, taking the item address and multiple-burst information out from the lookup information storage module;

for the case of multiple-burst item, first determining through the control module whether the vlds corresponding to 2^S contiguous addresses after a low first-threshold-M bit address of an address is left shifted for S bits are valid;

if all of them are valid, reading the cache after mediation of a second mediation module, and comparing high second-threshold-N bits of an acquired address with high second-threshold-N bits of the taken-out address; and if they match, replacing data of a corresponding address with the item data returned from the off-chip memory and writing data back into the cache, and returning data to the service side through a distribution module.

17. The method according to claim 16, further comprising:

when the lookup request is received, determining through the control module, by the comparison module, whether vld corresponding to 2^S contiguous requests after a low first-threshold-M bit address of a service request is left shifted for S bits is valid according to a multiple-burst identifier carried in the lookup request;

if it is valid, reading data of a corresponding cache, and determining whether a high second-threshold-N bit address of the service request matches an address in the cache; and if they match, directly returning data to the service side; and if they do not match, initiating the request for looking up the off-chip memory.

18. The method according to claim 17, further comprising:

after the item data is returned, reading, by the comparison module, the lookup information storage module to acquire a lookup request address and a multiple-burst identifier;

determining through the control module whether vld corresponding to 2^S contiguous requests after the low first-threshold-M bit address of the service request is left shifted for S bits is valid;

if all of them are valid, reading the data of the corresponding cache; determining whether the high second-threshold-N bit address of the service request matches a service address returned to the cache;

if they match, returning the item data in the cache to the service side through the distribution module, and not updating the item data in the cache;

if they do not match, directly returning the item data in the off-chip memory to the service side through the distribution module, and updating the item data in the cache; and if a vld corresponding to multiple-bursts is partially valid, which indicates that the item update is not completed, returning the item data in the off-chip memory to the service side through the distribution module, and not updating the item data in the cache.

19. A non-transitory computer storage medium having stored therein computer executable instructions arranged to perform a method for improving an item access bandwidth and atomic operation, the method comprising:

after a lookup request is received from a service side, determining whether an address pointed to by the lookup request is identical to an item address stored in a cache;

if they are identical, and a valid identifier vld is currently valid, directly returning item data stored in the cache to the service side without initiating a request for looking up an off-chip memory, so as to reduce accessing the off-chip memory;

if they are not identical, initiating a request for looking up the off-chip memory, and processing, according to a preset rule, item data returned by the off-chip memory in such a way that an atomic operation existed in item updating can realize a seamless and faultless lookup in an item lookup process, wherein the preset rule is used for determining whether the address pointed to by the lookup request is identical to the item address stored in the cache, comprising any one of the following ways:

way 1: if a vld corresponding to a low first-threshold-M bit address is completely valid, and a high second-threshold-N bit address is identical to the item address stored in the cache, returning data in the cache to the service side, and not updating the data in the cache; if the addresses are not identical, not updating the data in the cache, and sending the data returned by the off-chip memory to the service side;

way 2: if the vld corresponding to the low first-threshold-M bit address is partially valid, not updating the data in the cache, and sending the data returned by the off-chip memory to the service side; and way 3: if the vld corresponding to the low first-threshold-M bit address is invalid, updating the data in the cache, and sending the data returned by the off-chip memory to the service side, and wherein both M and N are natural numbers, and a sum of M and N is a bit width requested by the service side.

* * * * *